United States Patent
Weilig et al.

(10) Patent No.: US 12,479,142 B2
(45) Date of Patent: Nov. 25, 2025

(54) DRIVE UNIT FOR A MOLDING MACHINE

(71) Applicant: ENGEL AUSTRIA GmbH, Schwertberg (AT)

(72) Inventors: Roland Weilig, Baumgartenberg (AT); Christoph Balka-Hintersteiner, Schwertberg (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 168 days.

(21) Appl. No.: 18/378,775

(22) Filed: Oct. 11, 2023

(65) Prior Publication Data
US 2024/0123668 A1    Apr. 18, 2024

(30) Foreign Application Priority Data
Oct. 13, 2022  (AT) ................. A 50791/2022

(51) Int. Cl.
*B29C 45/83*   (2006.01)
*B29C 35/00*   (2006.01)
*B29C 35/16*   (2006.01)
*B29C 45/50*   (2006.01)
(Continued)

(52) U.S. Cl.
CPC ............ *B29C 45/83* (2013.01); *B29C 35/002* (2013.01); *B29C 45/5008* (2013.01); *B29C 45/74* (2013.01); *B29C 45/78* (2013.01); *B29C 2035/1608* (2013.01);
(Continued)

(58) Field of Classification Search
CPC .......................... B29C 45/5008; B29C 35/002
See application file for complete search history.

(56) References Cited

U.S. PATENT DOCUMENTS 5,811,136 A * 9/1998 Morita ................. B29C 45/74
                                                        425/550
11,390,003 B2    7/2022 Dimmler et al.
(Continued)

FOREIGN PATENT DOCUMENTS

| AT | 12643 U1 * | 7/2012 | |
|---|---|---|---|
| AT | 509188 B1 * | 12/2012 | ............ B29C 45/17 |
| AT | 523837 | 12/2021 | |

(Continued)

OTHER PUBLICATIONS

Machine translation EP0090863A1 (Year: 1983).*
(Continued)

*Primary Examiner* — Abbas Rashid
*Assistant Examiner* — Wayne K. Swier
(74) *Attorney, Agent, or Firm* — Wenderoth, Lind & Ponack, L.L.P.

(57) ABSTRACT

A drive unit for a molding machine for longitudinally displacing a movable first machine component relative to a second machine component, includes a rotationally drivable spindle mounted in a linear movement-locking manner on the second machine component, a spindle nut arranged in a rotational movement-locking manner on the first machine component for positive-locking engagement with the spindle, and a fluid chamber which at least adjoins the spindle and/or the spindle nut, and contains a lubricant. A temperature control element for controlling the temperature of the lubricant is arranged in and/or on the fluid chamber at least in areas.

28 Claims, 3 Drawing Sheets

(51) Int. Cl.
*B29C 45/74* (2006.01)
*B29C 45/78* (2006.01)

(52) U.S. Cl.
CPC ............... *B29C 2045/5052* (2013.01); *B29C 2945/76531* (2013.01); *B29C 2945/76692* (2013.01)

(56) References Cited

U.S. PATENT DOCUMENTS

2003/0230830 A1* 12/2003 Terada .................... B29C 45/72
425/169
2022/0118666 A1 4/2022 Dimmler et al.

FOREIGN PATENT DOCUMENTS

| DE | 102006005300 A1 * | 8/2006 | ......... B29C 45/5008 |
|---|---|---|---|
| DE | 102010051766 A1 * | 5/2011 | ............ B29C 45/17 |
| DE | 10 2021 126 694 | 4/2022 | |
| EP | 0090863 A1 * | 12/1983 | |
| JP | 2003-112352 | 4/2003 | |
| JP | 2009051139 A * | 3/2009 | |
| JP | 2012096425 A * | 5/2012 | |
| TW | 201315918 | 4/2013 | |

OTHER PUBLICATIONS

Machine translation JP2003112352A (Year: 2003).*
Machine translation DE102006005300A1 (Year: 2006).*
Machine tranlsation JP2009051139A (Year: 2009).*
Machine translation AT509188B1 (Year: 2012).*
Machine translation AT12643U1 (Year: 2012).*
Meerstett Engineering GmbH "Heating and Cooling with a Peltier Controller" 2025 https://www.meerstetter.ch/customer-center/compendium/16-heating-and-cooling-with-a-peltier-controller. (Year: 2025).*
Machine translation DE102010051766A1 (Year: 2011).*
Machine translation JP2012096425A (Year: 2012).*

* cited by examiner

DRIVE UNIT FOR A MOLDING MACHINE

BACKGROUND OF THE INVENTION

The present invention relates to a drive unit for a molding machine.

It furthermore relates to an injection unit with such a drive unit, and to a molding machine with an injection unit and/or a drive unit.

Drive units of the named type are subjected to high loads, in particular high temperature loads, above all during molding processes in the high-performance range with very short cycle times.

In order to keep the loads as low as possible, drive units usually need to be cooled.

It is known from the state of the art, for example also in the case of ball screws of electrical units, to transport the lubricant contained in the drive unit by a pump to a heat exchanger, by which the lubricant is cooled and is then returned to the drive unit again at a lower temperature.

The lubricant is guided or pumped by a pump through a heat exchange loop specifically provided for cooling the lubricant. The heat exchange loop usually comprises a pump, a heat exchanger, lubricant lines, lubricant chambers etc.

During the heat exchange process for cooling the lubricant, an uneven distribution of the lubricant can occur as a result of the pumping effect. In particular, when more lubricant is extracted from the drive unit than is returned, the lubrication of the drive unit can be insufficient, and can even lead to the drive unit drying out.

In the insufficiently lubricated or even dried-out state the normal function of the drive unit no longer exists, which can be associated, e.g., with a significantly increased wear of component parts or even a malfunction.

SUMMARY OF THE INVENTION

The object of the present invention is therefore to provide a drive unit which is improved compared with the state of the art, tackles the cooling of the drive in a different way and thus avoids the named problems from the outset.

This object is achieved by a drive unit in which at least one temperature control element for controlling the temperature of the lubricant is arranged in and/or on the fluid chamber at least in areas.

Protection is furthermore sought for an injection unit for a molding machine with at least one drive unit according to the invention, preferably two drive units according to the invention.

Protection is also sought for a molding machine, in particular injection-molding machine, with at least one injection unit according to the invention and/or at least one drive unit according to the invention.

By molding machines may be meant injection-molding machines, transfer-molding machines, presses and the like. Molding machines in which the plasticized material is supplied to an open mold are also entirely conceivable.

The major advantage of the invention is that the heat exchange loop specifically provided for cooling the lubricant is entirely omitted. That is to say, at least one pump and one heat exchanger can be dispensed with, as a result of which a failure of these component parts cannot even occur in the first place.

According to the invention and advantageously, the at least one temperature control element has a temperature control effect and controls the temperature of the lubricant and/or the loaded component parts of the drive unit, in particular the spindle and/or spindle nut, essentially by the temperature control element having a temperature that is different from the component parts and/or from the lubricant in the fluid chamber.

In the particularly preferred case, the at least one temperature control element has a lower temperature than the loaded component parts and/or than the lubricant and therefore has a cooling effect.

The at least one temperature control medium preferably adjoins at least one of the component parts and/or the fluid chamber and/or surrounds at least one component part and/or the fluid chamber.

A heat transfer thus takes place at least at the boundary layer between the at least one temperature control element and at least one loaded component part, with the result that the loaded component parts can be cooled, in particular wherein the temperature of the lubricant can be altered.

A further advantage of the invention is that the lubricant substantially remains in the fluid chamber, with the result that a sufficient lubrication of the drive unit is guaranteed, wherein at the same time a drying out is prevented.

Through the movement of the machine components relative to one another, lubricant cooled by the temperature control element is moved through the interspaces between the component parts which contain lubricant and/or adjoin the fluid chamber, and mixes with warmer lubricant. As a result, the component parts of the drive unit, in particular the spindle and spindle nut, are in particular cooled by heat conduction and/or convection.

In a preferred embodiment, the first machine component and/or the second machine component is a receiving plate and/or a mounting plate of an injection unit of a molding machine.

The drive unit is essentially a longitudinal drive and/or a spindle drive.

It is conceivable that a drive unit according to the invention can be used in and/or can be subsequently installed in already known embodiments of injection units and/or molding machines of the state of the art.

It is particularly preferable that the lubricant is an oil, e.g. a hydraulic oil.

The lubricant can also be a grease.

It is particularly preferable that the spindle has a thread running around the spindle at least in areas, which is, preferably completely, enclosed by the fluid chamber.

It is particularly preferable that the temperature control element comprises at least one sleeve, such as e.g. a thrust sleeve, sliding sleeve, cuff, bushing or the like, which surrounds the fluid chamber and/or the spindle and/or the spindle nut at least in areas.

The temperature control element can also comprise a Peltier element.

It is particularly preferable that the temperature control element comprises at least one active cooling means (i.e., active cooling element), preferably at least one fan and/or at least one pump.

Preferably, an active cooling means is essentially an in particular drivable device for moving a temperature control medium, in particular in order to force a convection of the temperature control medium.

A temperature control medium can be air, water, a coolant or the like and/or is in particular suitable for cooling.

In principle, a temperature control medium can, however, also be suitable for warming and/or for heating.

It is particularly preferable that the temperature control element has at least one passive cooling means (i.e., passive cooling element), preferably at least one hole and/or at least one cooling fin.

Preferably, a passive cooling means generally does not require a drive, motor or the like.

It is preferable that a temperature control medium, preferably a temperature control fluid, such as e.g. water and/or coolant, can flow through the at least one passive cooling means, preferably the at least one hole and/or the at least one cooling fin.

Preferably, the temperature control element has at least one temperature control medium channel for receiving a temperature control medium.

It is preferable that the at least one temperature control medium channel is arranged within the sleeve, preferably running parallel and/or transverse to an axis of rotational symmetry of the sleeve at least in areas.

However, it is also conceivable that the at least one temperature control medium channel runs within the sleeve in a different way, for example in the shape of a spiral, wave or line.

It is particularly preferable that the temperature control element comprises at least two, preferably closable, openings for the supply and/or discharge of a temperature control medium.

The openings can be arranged in an end face and/or a lateral surface of a sleeve.

At least one of the two openings can be a, preferably closable, supply opening and/or another opening can be a, preferably closable, discharge opening.

The at least two openings, e.g. at least one supply opening and at least one discharge opening, can be arranged in the at least one temperature control medium channel.

Particularly preferably, the at least two openings, e.g. at least one supply opening and at least one discharge opening, of the temperature control element are formed such that they can be connected to a temperature control medium loop.

It is conceivable that the temperature control medium channel can also be used to cool other components of an injection unit and/or molding machine.

It may be the case that at least one valve, for example check valve, is arranged in at least one of the at least two openings, e.g. the supply opening and/or the discharge opening, and/or in the temperature control medium channel.

Particularly preferably, the drive unit comprises at least two sleeves that engage in one another, wherein a first sleeve is arranged on the first machine component and a second sleeve is arranged on the second machine component.

Particularly preferably, the fluid chamber adjoins the spindle and/or the spindle nut and/or the first machine component and/or the second machine component and/or the first sleeve and/or the second sleeve.

Particularly preferably, the drive unit has at least one sealing element, comprising e.g. a sealing ring, tape, material etc., in particular for sealing the fluid chamber.

The drive unit particularly preferably has at least one sealing element at least between the first sleeve and the second sleeve.

It is particularly preferable that the drive unit comprises at least one rotary drive unit, in particular for driving the spindle.

The drivable spindle is preferably rotationally mounted by means of at least one bearing.

It is particularly preferable that the spindle and the spindle nut are formed corresponding to a ball screw.

In a preferred embodiment, the first machine component or the second machine component is connected in a linear movement-locking manner to an injection piston, preferably an injection screw, with the result that the injection piston is linearly movable by the at least one drive unit.

In a particularly preferred embodiment, the injection unit has at least two drive units.

An injection piston, preferably which is rotationally and/or translationally mounted in the first machine component or second machine component, can be linearly drivable by at least two drive units.

BRIEF DESCRIPTION OF THE DRAWINGS

Further advantages and details of the invention will be revealed below with reference to the drawings, in which.

DETAILED DESCRIPTION OF THE INVENTION

Figure 1:
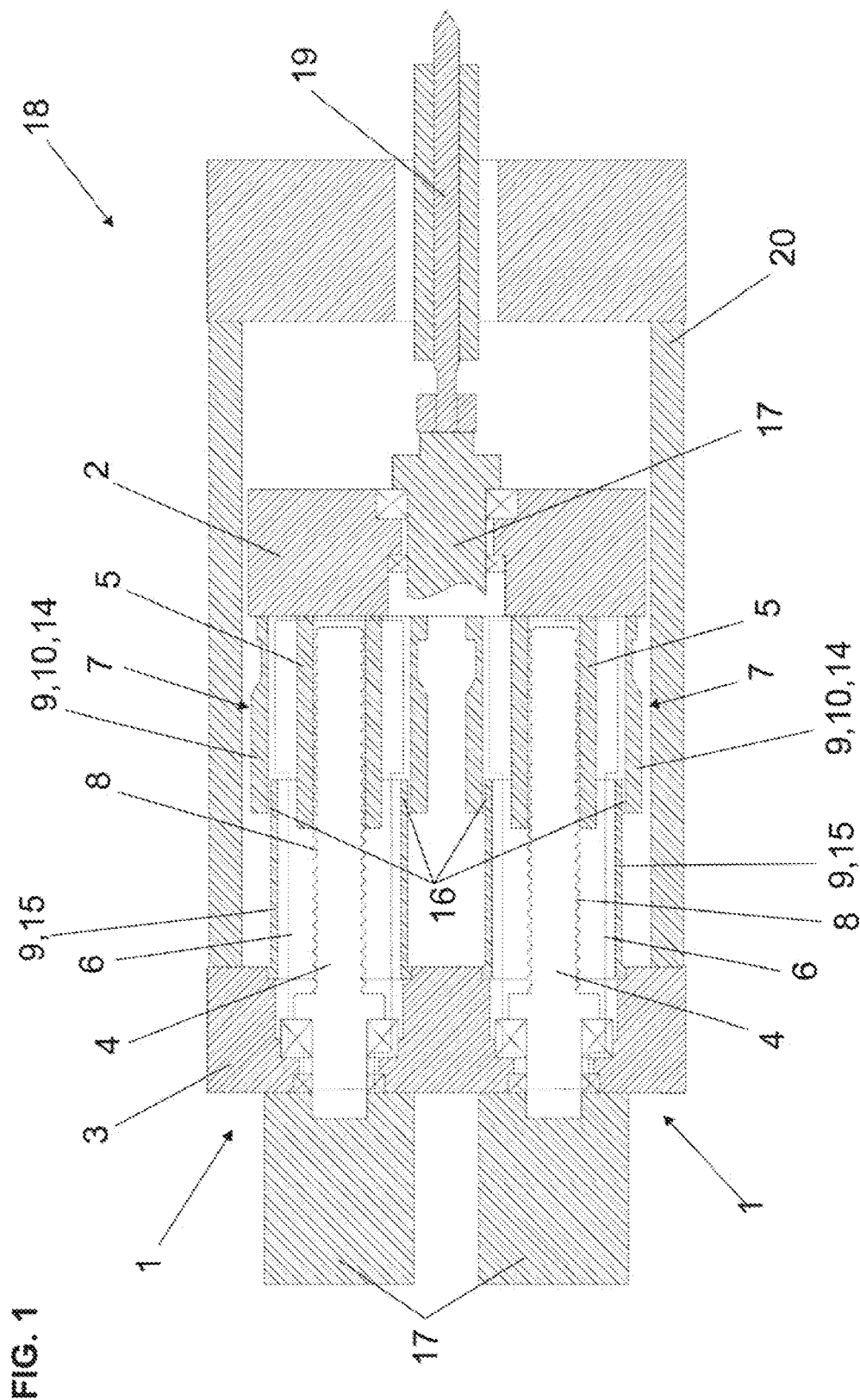
FIG. 1 shows an embodiment of an injection unit with two drive units according to the invention.

FIG. 1 shows a section through an embodiment of an injection unit 18 with two drive units 1 according to the invention.

Each drive unit 1 for longitudinally displacing a movable first machine component 2 relative to a second machine component 3, includes:
  an in particular rotationally drivable spindle 4 which is mounted in a linear movement-locking manner on the second machine component 3, and
  a spindle nut 5 which is arranged in a rotational movement-locking manner on the first machine component 2 for positive-locking engagement with the spindle 4, and
  at least one fluid chamber 6, which at least adjoins the spindle 4 and/or the spindle nut 5, containing a lubricant, preferably an oil or grease.

At least one temperature control element 7 for controlling the temperature of the lubricant is arranged in and/or on the fluid chamber 6 at least in areas.

Preferably, the spindle 4 of the drive unit 1 has a thread 8 running around at least a portion of the spindle 4. The spindle 4 is, preferably completely, enclosed by the fluid chamber 6.

Preferably, the temperature control element 7 comprises at least one sleeve 9, which at least partially surrounds the fluid chamber 6 and/or the spindle 4 and/or the spindle nut 5.

It may also be the case that the temperature control element 7 comprises a Peltier element and/or an active cooling means (i.e., active cooling element), preferably at least one fan and/or at least one pump, particularly preferably for moving a temperature control medium.

It may also be the case that an active cooling means that is already present in the injection unit 18 and/or the molding machine can be used to move a temperature control medium.

For example, a present cooling loop of an injection unit 18 and/or molding machine can also be used to move the temperature control medium, such as e.g. water.

As shown in FIG. 1, particularly preferably, the temperature control element 7 has at least one passive cooling means (i.e., passive cooling element) 10 in the form of at least one sleeve 9.

A passive cooling means 10 can, however, also be at least one hole, cooling fin or the like.

By a passive cooling means 10 is essentially meant a component part which does not have a drive or the like and/or through and/or around which a fluid can flow for heat transfer.

In the particularly preferred embodiment of FIG. 1, each drive unit 1 comprises at least two sleeves 9 that engage in one another. A first sleeve 14 is arranged on the first machine component 2, and a second sleeve 15 is arranged on the second machine component 3.

Particularly preferably, the fluid chamber 6 adjoins the spindle 4 and/or the spindle nut 5 and/or the first machine component 2 and/or the second machine component 3 and/or the first sleeve 14 and/or the second sleeve 15.

Preferably, the drive unit 1 has at least one sealing element 16, preferably between the first sleeve 14 and the second sleeve 15, for sealing the fluid chamber 6.

The first sleeve 14, that is e.g. the thrust sleeve, and the second sleeve 15, that is e.g. the sealing sleeve, can, as shown in FIG. 1, engage in one another and/or at least partially overlap.

As shown in the particularly preferred embodiment of FIG. 1, it is particularly preferably provided that each drive unit 1 comprises at least one rotary drive 17 for driving the spindle 4 and/or at least one injection piston 19.

In this preferred variant, in each case a spindle 4 and an associated spindle nut 5 are formed corresponding to a ball screw.

In the embodiment of an injection unit 18 shown in FIG. 1, the first machine component 2 is connected in a linear movement-locking manner to an injection piston 19, preferably an injection screw and/or an injection cylinder.

In this embodiment, the first machine component 2 is a receiving plate for at least one injection piston 19.

In principle, the second machine component 3 can also be connected to an injection piston 19, preferably an injection screw and/or an injection cylinder.

In this embodiment, the second machine component 3 is a mounting plate, on which at least the spindles 4 are mounted and/or the second sleeves 15 are arranged and/or rotary drives 17 are arranged.

The second sleeves 15 can also be understood to be a type of sealing sleeve, in particular which seal and/or delimit the fluid chambers 6.

An injection cylinder 20, which is essentially a housing of the injection unit 18, is furthermore shown in FIG. 1.

In the description of the further figures that now follow, primarily the differences from the first embodiment will be discussed, to avoid repetitions. Otherwise, the above description of the first embodiment, to the extent to which it may be applicable, also applies to the embodiments also described in the following.

Figure 2:
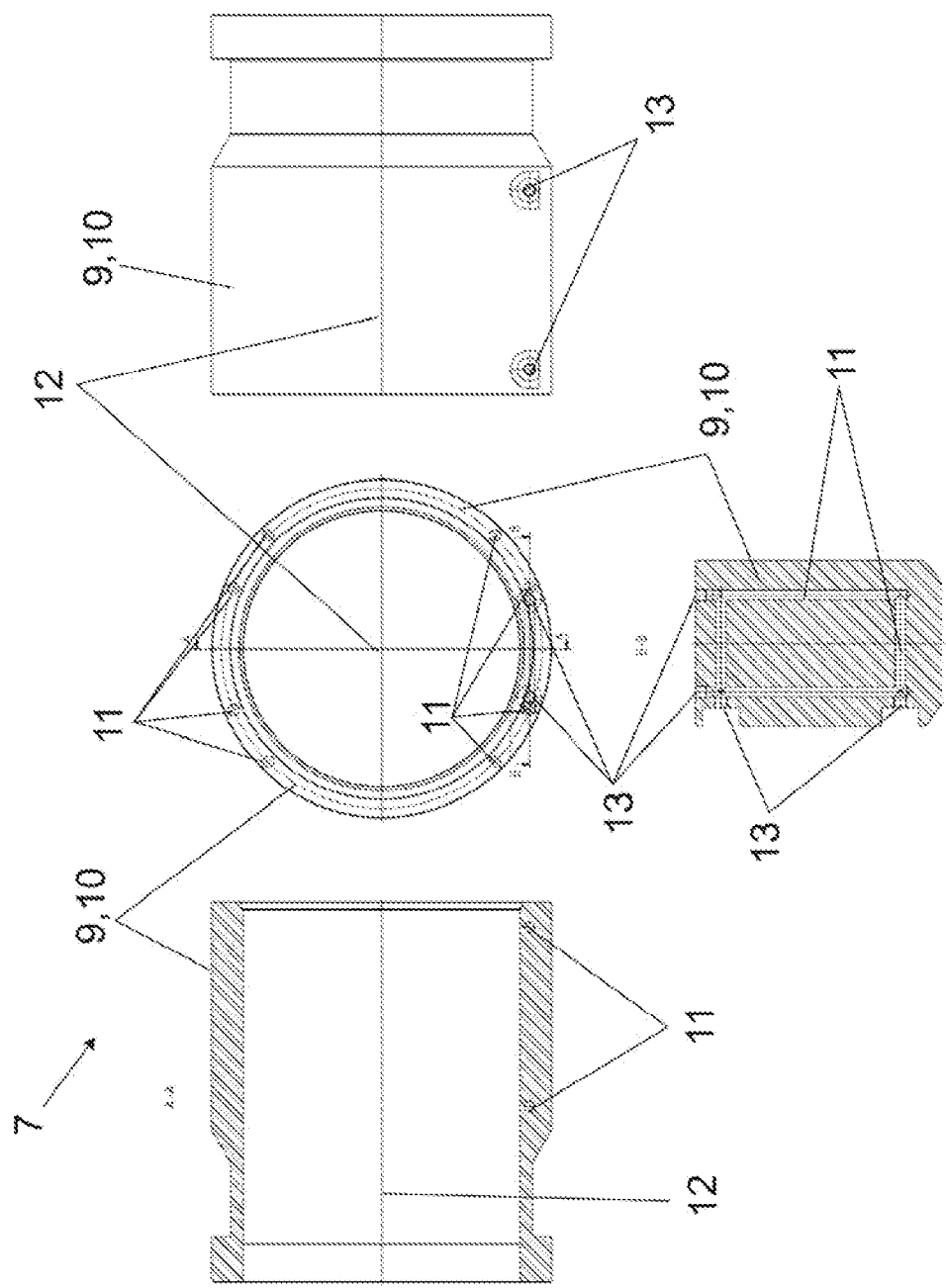
FIG. 2 shows an embodiment of a temperature control element.

FIG. 2 shows several views and sections of an embodiment of a temperature control element 7 of a drive unit 1 with a passive cooling means (i.e., passive cooling element) 10 in the form of a sleeve 9.

As shown in this embodiment, it is particularly preferable that the temperature control element 7 has at least one temperature control medium channel 11 for receiving a temperature control medium which is preferably suitable for cooling.

A temperature control medium channel 11 substantially makes an internal channeling and/or distribution of a temperature control medium possible, in order to control the temperature of, in particular to cool, the temperature control element 7.

The at least one temperature control medium channel 11 can be arranged within the sleeve 9, preferably running parallel and/or transverse to an axis of rotational symmetry 12 of the sleeve 9 at least in areas.

As shown in the embodiment of FIG. 2, preferably the temperature control element 7 comprises at least two, preferably closable, openings 13 for the supply and/or discharge of a temperature control medium.

The at least two openings 13 of the temperature control element 7 can be formed such that they can be connected to a temperature control medium loop, in particular already present in a molding machine.

Figure 3:
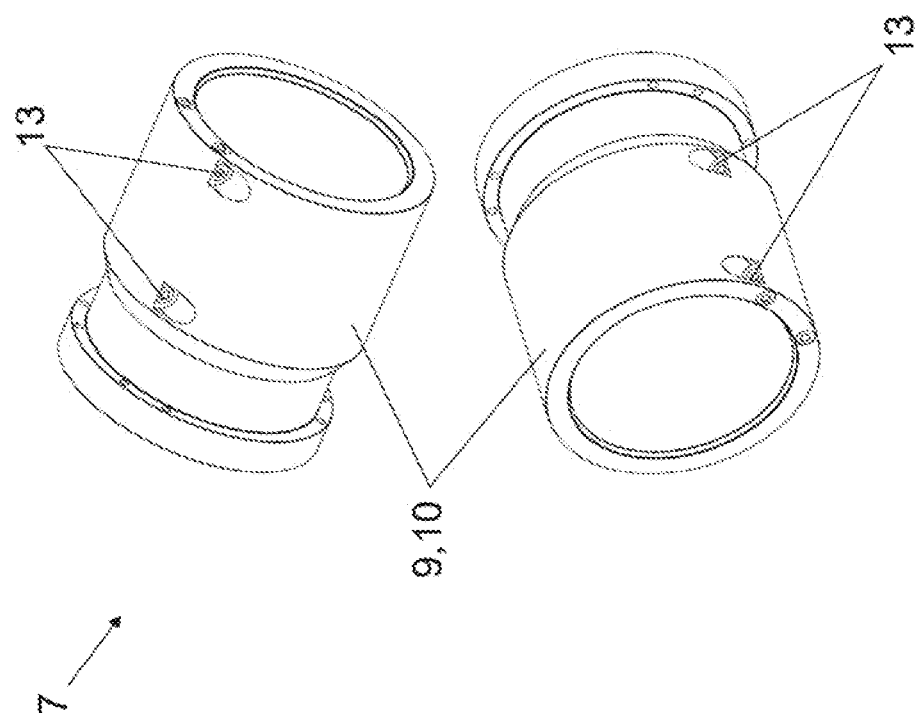
FIG. 3 shows an embodiment of a temperature control element.

FIG. 3 shows two perspective views of the embodiment of a temperature control element 7 of a drive unit 1 shown in FIG. 2, wherein the temperature control element 7 is a passive cooling means 10 in the form of a sleeve 9.

In general, it is conceivable that the drive unit 1 comprises an acquisition unit and/or can be connected to an acquisition unit, wherein an acquisition unit is substantially formed for the acquisition of data, e.g. relating to the temperature of the lubricant and/or component parts.

LIST OF REFERENCE NUMBERS 1 drive unit
2 first machine component
3 second machine component
4 spindle
5 spindle nut
6 fluid chamber
7 temperature control element
8 thread
9 sleeve
10 passive cooling means
11 temperature control medium channel
12 axis of rotational symmetry
13 openings
14 first sleeve
15 second sleeve
16 sealing element
17 rotary drive
18 injection unit
19 injection piston
20 injection cylinder

The invention claimed is:

1. A drive unit for use in a molding machine for longitudinally displacing a movable first machine component relative to a second machine component, the drive unit comprising:
  a rotationally drivable spindle mounted in a linear movement-locking manner on the second machine component;
  a spindle nut arranged in a rotational movement-locking manner on the first machine component for positive-locking engagement with the spindle;
  a fluid chamber adjoining at least one of the spindle and the spindle nut, the fluid chamber containing a lubricant; and
  a temperature control element configured to control the temperature of the lubricant in the fluid chamber, the temperature control element being arranged at least partially in and/or on the fluid chamber, the temperature control element including a sleeve at least partially surrounding at least one of the fluid chamber, the spindle, and the spindle nut.

2. The drive unit according to claim 1, wherein the lubricant is an oil.

3. The drive unit according to claim 1, wherein the spindle has a thread running around at least a portion of the spindle, the spindle being enclosed by the fluid chamber.

4. The drive unit according to claim 1, wherein the temperature control element comprises a Peltier element.

5. The drive unit according to claim 1, wherein the temperature control element comprises an active cooling element.

6. The drive unit according to claim 1, wherein the temperature control element comprises a passive cooling element.

7. The drive unit according to claim 6, wherein a temperature control medium flows through the passive cooling element.

8. The drive unit according to claim 1, wherein the temperature control element has a temperature control medium channel for receiving a temperature control medium suitable for cooling.

9. The drive unit according to claim 8, wherein the temperature control medium channel is arranged within the sleeve.

10. The drive unit according to claim 1, wherein the temperature control element comprises at least two openings for the supply and/or discharge of a temperature control medium.

11. The drive unit according to claim 10, wherein the at least two openings of the temperature control element are formed to be connected to a temperature control medium loop.

12. A drive unit for use in a molding machine for longitudinally displacing a movable first machine component relative to a second machine component, the drive unit comprising:
  a rotationally drivable spindle mounted in a linear movement-locking manner on the second machine component;
  a spindle nut arranged in a rotational movement-locking manner on the first machine component for positive-locking engagement with the spindle;
  a fluid chamber adjoining at least one of the spindle and the spindle nut, the fluid chamber containing a lubricant;
  a temperature control element for controlling the temperature of the lubricant in the fluid chamber, the temperature control element being arranged at least partially in and/or on the fluid chamber; and
  at least two sleeves engaging in one another, wherein a first sleeve of the at least two sleeves is arranged on the first machine component and a second sleeve of the at least two sleeves is arranged on the second machine component.

13. The drive unit according to claim 12, wherein the fluid chamber adjoins at least one of the spindle, the spindle nut, the first machine component, the second machine component, the first sleeve, and the second sleeve.

14. The drive unit according to claim 1, further comprising a sealing element for sealing the fluid chamber.

15. The drive unit according to claim 1, further comprising a rotary drive for driving the spindle.

16. The drive unit according to claim 1, wherein the spindle and the spindle nut are formed corresponding to a ball screw.

17. An injection unit for use in a molding machine comprising the drive unit according to claim 1.

18. The injection unit according to claim 17, wherein the first machine component or the second machine component is connected in a linear movement-locking manner to an injection piston.

19. An injection-molding machine comprising the injection unit according to claim 17.

20. The drive unit according to claim 3, wherein the spindle is completely enclosed by the fluid chamber.

21. The drive unit according to claim 1, wherein the active cooling element is a fan and/or a pump to move a temperature control medium.

22. The drive unit according to claim 1, wherein the passive cooling element is at least one of a hole, a cooling fin, or a sleeve.

23. The drive unit according to claim 7, wherein the temperature control medium is one of a temperature control liquid and a temperature control gas, and the passive cooling element is at least one of a hole, a cooling fin, or a sleeve.

24. The drive unit according to claim 9, wherein the temperature control medium channel extends parallel and/or transverse to an axis of rotational symmetry of at least a portion of the sleeve.

25. The drive unit according to claim 10, wherein the at least two openings of the temperature control element are closable, and the at least two openings are arranged in an end face and/or a lateral surface of the sleeve.

26. The drive unit according to claim 14, wherein the sleeve is a first sleeve of the at least two sleeves, the sealing element being arranged between the first sleeve and a second sleeve of the at least two sleeves.

27. An injection unit for use in a molding machine comprising two drive units, each of the two drive units being configured according to claim 1.

28. The injection unit according to claim 17, wherein the first machine component or the second machine component is connected in a linear movement-locking manner to an injection screw.

* * * * *